United States Patent
Suzuki

[11] Patent Number: 6,119,660
[45] Date of Patent: Sep. 19, 2000

[54] COMPRESSION-IGNITION INTERNAL COMBUSTION ENGINE HAVING COMBUSTION HEATER

[75] Inventor: Makoto Suzuki, Mishima, Japan

[73] Assignee: Toyota Jidosha Kabushiki Kaisha, Toyota, Japan

[21] Appl. No.: 09/281,702

[22] Filed: Mar. 30, 1999

[30] Foreign Application Priority Data

Apr. 27, 1998 [JP] Japan .................................. 10-117360

[51] Int. Cl.$^7$ .............................. F02M 37/04; F02G 5/00
[52] U.S. Cl. ........................................... 123/501; 123/550
[58] Field of Search ..................... 123/500, 501, 123/502, 543, 545, 549, 550, 552

[56] References Cited

U.S. PATENT DOCUMENTS

| 2,290,300 | 7/1942 | Spackman . |
| 3,960,121 | 6/1976 | Backus .................... 123/550 |
| 4,212,162 | 7/1980 | Kobayashi ............ 60/39.63 |
| 4,823,757 | 4/1989 | Redele .................... 123/501 |
| 4,858,825 | 8/1989 | Kawamura . |
| 4,927,077 | 5/1990 | Okada . |

FOREIGN PATENT DOCUMENTS

| 271999 | 6/1988 | European Pat. Off. . |
| 1497428 | 12/1967 | France . |
| 2381175 | 9/1978 | France . |
| 4411859 | 10/1995 | Germany . |
| 60-244614 | 12/1985 | Japan . |
| 62-75069 | 4/1987 | Japan . |
| 62-99414U | 6/1987 | Japan . |
| 918466 | 4/1980 | Russian Federation . |
| 1595060 | 8/1981 | United Kingdom . |

OTHER PUBLICATIONS

Patent Abstracts of Japan, vol. 018, No. 600 (P–1826), Nov. 15, 1994.

*Primary Examiner*—Thomas N. Moulis
*Attorney, Agent, or Firm*—Kenyon & Kenyon

[57] ABSTRACT

In the compression-ignition internal combustion engine having the combustion heater for introducing combustion gas into a mainstream pipe constituting the intake system of the engine, a fuel injection timing by a injector of the engine is advanced as an output of the combustion heater is increased.

7 Claims, 6 Drawing Sheets

COMPRESSION-IGNITION INTERNAL COMBUSTION ENGINE HAVING COMBUSTION HEATER

BACKGROUND OF THE INVENTION

1. Field of the Invention

The present invention relates to a compression-ignition internal combustion engine having a combustion heater, and specifically to a compression-ignition internal combustion engine having a combustion heater for introducing combustion gas into an intake system of the internal combustion engine.

2. Description of the Related Art

When it is cold, it is necessary to facilitate warm-up of the internal combustion engine.

For this purpose, Japanese Patent Application Laid-open No. 62-75069, for example, discloses a technology for providing a combustion heater, independently of the internal combustion engine body, in an intake system of the internal combustion engine, introducing a combustion gas emitted from the combustion heater into the intake system, and facilitating warm-up of the internal combustion engine by utilizing combustion heat of the combustion gas.

In general, the combustion heater emits the combustion gas including a higher density of carbon dioxide when the combustion heater is used in a normal state, that is, under atmospheric pressure as compared with an exhaust gas of the internal combustion engine, and particularly of the compression-ignition internal combustion engine. Consequently, in the internal combustion engine in which the combustion gas from the combustion heater is introduced into the intake system as shown in the technology described in the above Japanese Patent Application Laid-open No. 62-75069, an intake air having a high density of carbon dioxide is used for engine combustion. In this case, therefore, oxidation reactions of hydrocarbon and carbon monoxide to form carbon dioxide become difficult to proceed. As a result, a larger amount of free hydrocarbon and carbon monoxide exist in the exhaust gas emitted from the internal combustion engine.

SUMMARY OF THE INVENTION

The present invention has been made with the above circumstances in view, and it is a technical object of the invention to provide a compression-ignition internal combustion engine having a combustion heater for introducing a combustion gas from the combustion heater into an intake system, wherein amounts of hydrocarbon and carbon monoxide contained in an exhaust gas can be decreased.

To achieve the above objects, a compression-ignition internal combustion engine having a combustion heater of the present invention has the following structures in the compression-ignition internal combustion engine having the combustion heater for introducing the combustion gas into an intake system of the internal combustion engine.

A fuel injection timing by a fuel injection system of the internal combustion engine is controlled according to an operational state of the combustion heater.

The compression-ignition internal combustion engine is, for example, a diesel engine. In a case of the diesel engine, a self-ignition system under a compression heat is adopted as an ignition system. Therefore, by changing the fuel injection timing by the fuel injection system, a combustion state in the cylinder can be changed. The operational state of the combustion heater is, for example, an output state of the combustion heater including states of combustion heater operating with a large output, operating with a small output, and not operating (that is, with an output of zero).

When the combustion heater of the present invention is actuated, the combustion gas emitted from the combustion heater is introduced into the intake system. Because the combustion gas introduced into the intake system contains a high density of carbon dioxide as described above, the intake air of a high density of carbon dioxide is used for combustion of the engine. Thus, a reaction from hydrocarbon to carbon monoxide and a reaction from carbon monoxide to carbon dioxide difficult to occur. The reason for this is because larger amounts of free hydrocarbon and carbon monoxide present in an exhaust gas emitted from the internal combustion engine when a large amount of carbon dioxide is contained in the intake air, that is, if it is stated at its most extreme, when carbon dioxide is saturated, oxidization reactions of hydrocarbon and carbon monoxide to form carbon dioxide become difficult to proceed. However, in the compression-ignition internal combustion engine having the combustion heater of the present invention, the amount of oxygen in the cylinder is larger than that of a theoretical air/fuel ratio. Also, the fuel injection timing is controlled in accordance with the operational state of the combustion heater. Therefore, by adjusting the fuel injection timing to facilitate the oxidization reaction, hydrocarbon and carbon monoxide contained in the exhaust gas can be decreased even if the combustion gas of the combustion heater containing a large amount of carbon dioxide is introduced into the internal combustion engine.

It is preferable that the fuel injection timing is advanced as the output of the combustion heater is increased.

In this case, as the output of the combustion heater is increased, the fuel is injected into the cylinder earlier. Thus, a speed of combustion is increased correspondingly to facilitate the oxidation reaction. Therefore, the amounts of hydrocarbon and carbon monoxide contained in the exhaust gas are decreased as compared with the case where the output of the combustion heater is small.

Furthermore, a magnitude of the output of the combustion heater can be determined by comparing an engine cooling water temperature with a predetermined temperature.

Moreover, it is preferable that the fuel injection timing is determined based on the magnitude of the output of the combustion heater.

It is further preferable that the fuel injection timing is determined based on a reference fuel injection timing which is a reference time of fuel injection and a correction value which shows an angle through which the fuel injection timing should be advanced relative to the reference fuel injection timing.

It is further preferable that the correction value is increased or decreased according to the magnitude of the output of the combustion heater.

It is further preferable that an exhaust system of the internal combustion engine is provided with a lean NOx catalyst. The lean NOx catalyst is a catalyst for purifying nitrogen oxides contained in the exhaust gas of the internal combustion engine by using hydrocarbon or carbon monoxide as a reducing agent. Therefore, when the lean NOx catalyst is used in the exhaust system of the internal combustion engine like the present invention, hydrocarbon and carbon monoxide contained in the exhaust gas of the internal combustion engine are used as reducing agents of the lean NOx catalyst. As a result, amounts of hydrocarbon and carbon monoxide contained in the exhaust gas of the internal combustion engine can be further decreased. Also, an amount of nitrogen oxides contained in the exhaust gas of the internal combustion engine can be decreased.

DESCRIPTION OF THE PREFERRED EMBODIMENTS

Best modes of carrying out the present invention will be described below on the basis of the accompanying drawings.
<General description of an entire system>

Figure 1:
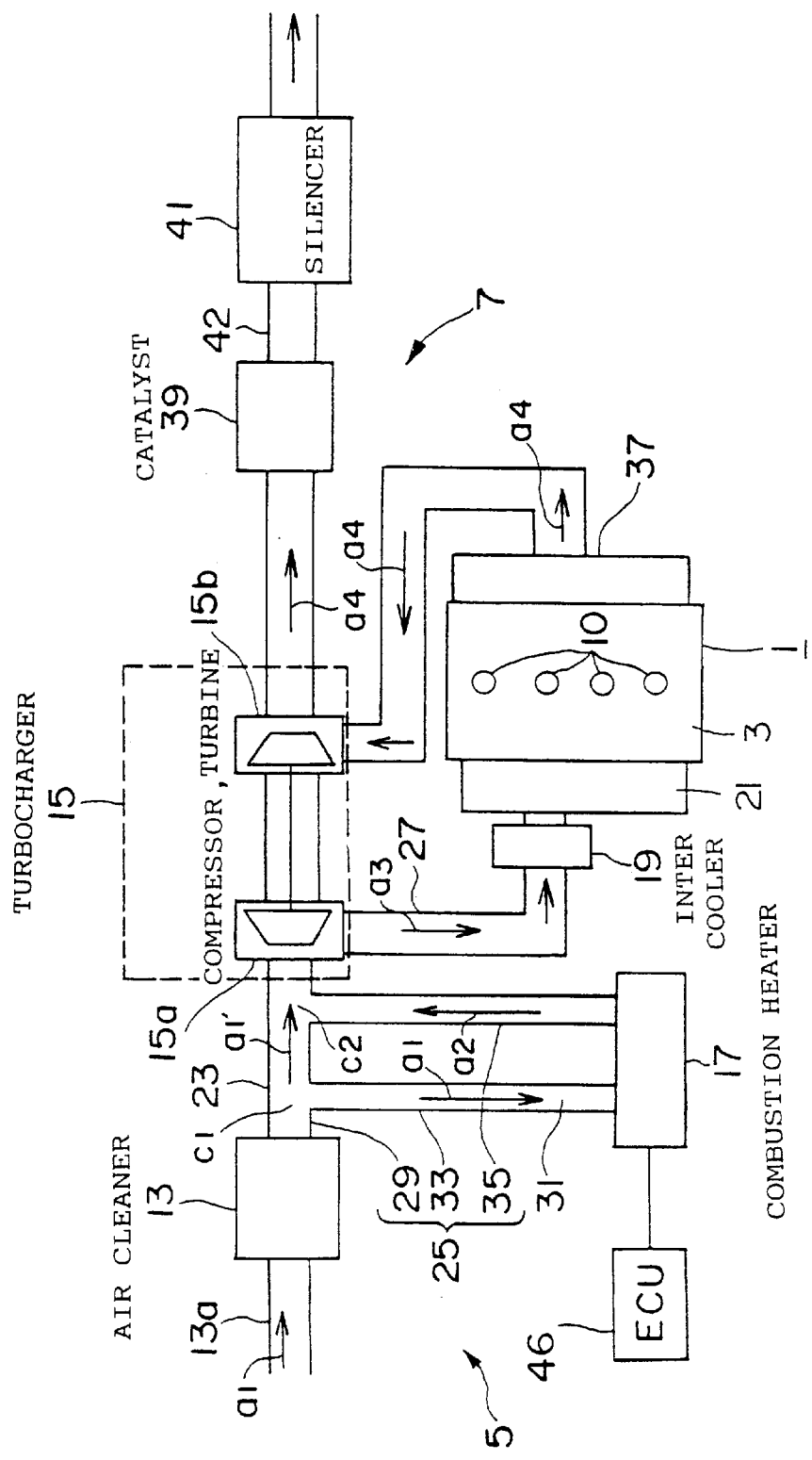
FIG. 1 is a schematic diagram showing a compression-ignition internal combustion engine having a combustion heater according to an embodiment of the present invention.

A diesel engine 1 as an internal combustion engine is a cooling water system. As shown in FIG. 1, the diesel engine 1 comprises an engine body 3, an intake system 5 for sending an air required for combustion into an unillustrated plurality of cylinders of the engine body 3, and an exhaust system 7 for discharging an exhaust gas into the atmosphere after combustion of an air/gas mixture in the cylinders.
<Description of constituting members of the system>
(Engine body 3)

The engine body 3 includes an injector 10 as a fuel injection system for injecting a fuel into the cylinders for combustion therein.
(Intake system 5)

The intake system 5 starts with an air cleaner 13 for filtering the outside air and terminates with an unillustrated intake port. The intake system 5 comprises structures including a compressor 15a of a turbocharger 15, a combustion heater 17 for combustion under the atmospheric pressure, an inter cooler 19, and an intake manifold 21, which are located between the air cleaner 13 and the intake port and forming the intake system.

The structures of the intake system are on an intake pipe 23 having a plurality of connecting pipes.
(Intake pipe 23)

The intake pipe 23 is divided roughly at the compressor 15a as a boundary into a downstream side connecting pipe 27 which is brought into a pressurized state because of the outside air entering the intake system 5 being forcibly intruded by the compressor 15a, and an upstream side connecting pipe 25 not brought into the pressurized state.
(Upstream side connecting pipe 25)

The upstream side connecting pipe 25 comprises a rod-shaped mainstream pipe 29 extending straightly from the air cleaner 13 toward the compressor 15a and a branch pipe 31 for the heater as a tributary connected in bypass to the mainstream pipe 29.
(Branch pipe 31 for heater)

The branch pipe 31 for heater includes at a midway portion thereof a combustion heater 17 for combustion under the atmospheric pressure. The branch pipe 31 for heater comprises an air supply passageway 33 for connecting an upstream side portion of the combustion heater 17 in an air flow direction with the mainstream 29 and for supplying a fresh air from the mainstream pipe 29 to the combustion heater 17, and a combustion gas discharge passageway 35 for connecting a downstream side portion of the combustion heater 17 in the air flow direction with the mainstream pipe 29 and for discharging the combustion gas from the combustion heater 17 into the mainstream pipe 29. The air related to the branch pipe 31 for heater contains a fresh air a1 flowing through the air cleaner 13 into the branch pipe 31 for heater and a combustion gas a2 emitted from the combustion heater 17.

The combustion gas of the combustion heater is a gas with little smoke, that is, the gas not containing carbon. Therefore, there is no problem even if the combustion gas is used as the intake air of the internal combustion engine. The combustion gas a2 contains a larger amount of carbon dioxide because the combustion gas a2 which returns to the mainstream pipe 29 is the combustion gas of the combustion heater 17 for combustion under the atmospheric pressure.

A connecting point c1 between the air supply passageway 33 and the mainstream pipe 29 is positioned more upstream of the mainstream pipe 29 than a connecting point c2 between the combustion gas discharge passageway 35 and the mainstream pipe 29. Therefore, the air a1 from the air cleaner 13 is divided at the connecting position c1 into the air a1 which is branched into the branch pipe 31 for heater and an air a1' which is not branched and flows through the mainstream pipe 29 toward the connecting point c2. The air a1 branched at the connecting point c1 turns into a combustion gas a2 after it is used for combustion in the combustion heater 17, and the combustion gas a2 becomes confluent at the connecting point c2 with the fresh air a1', which has not branched at the connecting point c1, and turns into a combustion gas mixed air a3.

The air a1 which has branched at the connecting point c1 flows through the air supply passageway 33, the combustion heater 17, and the combustion gas discharge passageway 35, and turns into the combustion gas a2 to return to the mainstream pipe 29 at the connecting point c2 as described above. The combustion gas a2 has a combustion heat upon being burnt in the combustion heater 17. Therefore, when the combustion gas a2 returns to the mainstream pipe 29, the gas a2 becomes confluent at the connecting point c2 with the air a1 ' which has not branched at the connecting point c1 and turns out as the combustion gas mixed air a3 as described above, the combustion gas mixed air a3 is used as the intake air having a high temperature which enters the engine body 3.

The combustion gas a2 contains a large amount of carbon dioxide as described above. When the gas a2 becomes confluent with the air a1' at the connecting point c2 to turns out the combustion gas mixed air a3, this combustion gas mixed air a3 is used as the intake air which enters the engine body 3 while the combustion gas mixed air a3 containing a large amount of carbon dioxide. A combustion state of the combustion heater 17 is controlled by a CPU which is the central unit of an ECU 46 which is a computer, namely an engine electronic control unit. If an air-fuel ratio of the combustion heater 17 is adjusted by this control, a concentration of carbon dioxide can be set freely.

The downstream side connecting pipe 27 is a pipe connecting the compressor 15a and the intake manifold 21, and the one shown in FIG. 1 is in an L-shaped. The inter cooler 19 is disposed at a position close to the intake manifold 21.
(Exhaust system 7)

On the other hand, the exhaust system 7 starts with an unillustrated exhaust port of the engine body 3 and terminates with a silencer 41. The exhaust system 7 comprises structures including an exhaust manifold 37, a turbine 15b of a turbocharger 15, and a catalyst converter 39, located between the exhaust port and the silencer 41 on an exhaust pipe 42 and constitute the exhaust system. The exhaust gas of the engine 1 flowing through the exhaust system 7 is indicated by a symbol a4.

(Catalyst converter 39)

The catalyst converter 39 uses a lean NOx catalyst as a three way catalyst therein. The catalyst converter 39 is an exhaust gas purifying device for purifying nitrogen oxides in the exhaust gas by using a reducing agent such as hydrocarbon and carbon monoxide when the exhaust system is in a state of atmosphere of having a particularly excess oxygen, that is, in a lean state. The lean NOx catalyst is classified into so-called a selective reducing type and an occlusion reducing type, and the occlusion reducing type of lean NOx catalyst is used in this embodiment.

(Combustion heater 17)

The combustion heater 17 includes a blowing fan which is unillustrated and a central processing control unit (hereinafter referred to as "CPU") 47 which is dedicated to control the operation of the combustion heater 17 and is provided separately from the ECU 46. An unillustrated CPU is also provided in the ECU 46, and the CPU 47 is not necessary in the combustion heater 17 if the combustion heater 17 is controlled by the unillustrated CPU in the ECU 46.

(ECU 46 and related members electrically connected thereto)

The ECU 46 is electrically connected to various sensors such as an outside air temperature sensor, a combustion gas temperature sensor, a rotational speed sensor, and a water temperature sensor which are not shown, and receives detected values from the sensors as electric signals. The ECU 46 is also electrically connected to the blowing fan and an unillustrated fuel pump via the CPU 47 to drive and control the them.

Furthermore, an opening degree of an unillustrated accelerator pedal, an intake amount of the engine, whether or not a starter motor has started, and the like are inputted into the ECU 46 as electric signals.

The ECU 46 makes an overall judgment based on the information respectively inputted therein. Then, based on the judgment, the ECU 46 transmits an output control signal to the combustion heater 17 for controlling an output thereof.

Moreover, the ECU 46 is also electrically connected to the injector 10. Thus, the ECU 46 transmits an output signal to the injector 10 for optimizing an amount of fuel injection and an injection timing of the injector 10.

The CPU 47 of the combustion heater 17 is actuated according to respective parameters detected by the various sensors, thereby controlling a combustion state of the combustion heater 17. In other words, a magnitude and force of flames, a temperature, and the like of the combustion heater 17 are controlled by the CPU 47, thereby to control a temperature of the exhaust gas (combustion gas) of the combustion heater 17.

If the CPU 47 determines that purification of nitrogen oxides by the lean NOx catalyst 39 is necessary according to the respective parameters detected by the respective sensors, the CPU 47 properly controls the combustion state of the combustion heater 17, thereby to maintain the magnitude and force of flames, the temperature, and the like of the combustion heater 17 in optimum states. With this control of the combustion state of the combustion heater 17 by the CPU 47, the CPU 47 adjusts the temperature of the exhaust gas of the combustion heater 17 and an amount of carbon dioxide contained in the combustion gas. In other words, the CPU 47 adjusts the output of the combustion heater 17.

"When purification of nitrogen oxides by the lean NOx catalyst 39 is necessary" means the time when specific conditions for purification of nitrogen oxides are satisfied. The specific condition refers to the time when the lean NOx catalyst converter 39 is being activated and also the NOx occluded in the lean NOx catalyst converter 39 is purified (for example, for every predetermined time period of operation). In order to activate the lean NOx catalyst 39, a temperature of the catalyst itself has to be increased to some degree.

Therefore, when purification of the nitrogen oxides by the lean NOx catalyst 39 is necessary, the temperature of the lean NOx catalyst 39 has to reach a temperature range which is enough to activate the catalyst 39.

Figure 2:
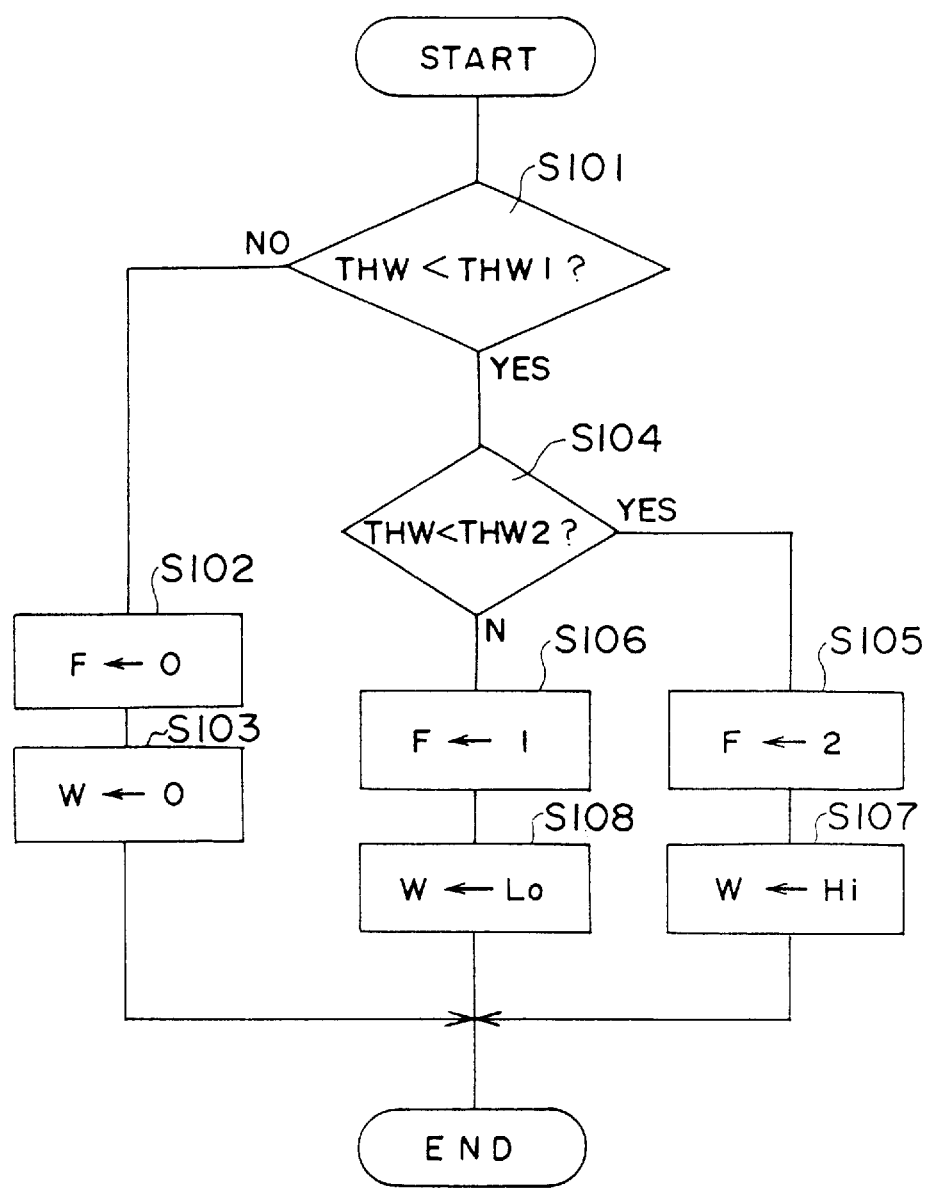
FIG. 2 is a flowchart showing an output control execution routine of the combustion heater.
Figure 3:
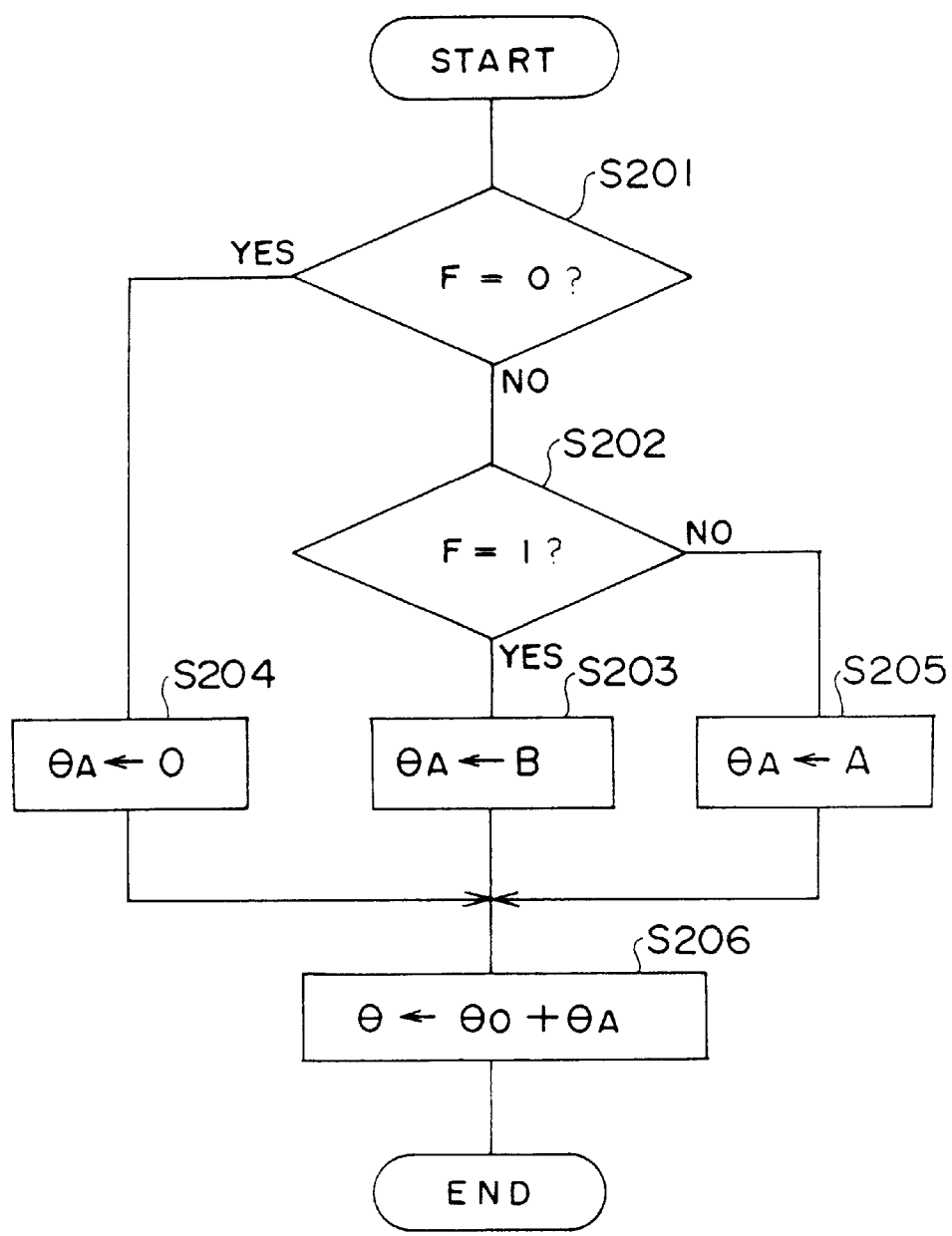
FIG. 3 is a flowchart showing a fuel injection timing operation routine.

On the other hand, routines shown by respective flowcharts of FIGS. 2 and 3 are stored in an unillustrated random-access memory RAM of the ECU 46.

Next, the respective routines will be described on the basis of the flowcharts.

(Flowchart for controlling the output of the combustion heater)

The flowchart of FIG. 2 shows an output control execution routine of the combustion heater.

The routine includes steps 101 to 108. All process steps described below, including process steps of a routine shown by the flowchart of FIG. 3, are carried out by the ECU 46. By using a letter S, the step 101 is abbreviated as S101, for example.

When a process shifts to this routine after starting of the engine 1, first, at S101, it is determined whether or not the engine 1 is in an operational state wherein the combustion heater 17 is necessary to be actuated. This determination is carried out by using one of factors which are used as measures of a determination that the combustion heater 17 should be actuated. For example, in this embodiment, a temperature THW of an engine cooling water is used as a factor. It is determined, in S101, whether or not the temperature THW of the engine cooling water is lower than a predetermined temperature THW1 which is a value to be compared with the temperature THW. In this case, an inequality symbol "THW<THW1 ?" is used for the determination. When determined negative in S101, the process proceeds to S102, and when determined affirmative, the process proceeds to S104. The engine's operational state which requires actuation of the combustion heater 17 is, for example, at a cold time or an extremely cold time, that the engine 1 is being operated, just after starting the engine 1, an exothermic amount of the engine itself is small or an amount of heat received by the cooling water is small due to the small exothermic amount of the engine 1 itself.

In the case where determined negative in S101, it means that the temperature THW of the cooling water is higher than the predetermined temperature THW1, and therefore, the engine 1 is in the operational state which does not require actuation of the combustion heater 17. Thus, in the next S102, a value of a combustion heater execution flag F is set at "0". After that, in S103, an output value W of the combustion heater 17 is set at 0 (zero), and this routine is finished.

On the other hand, S104 and succeeding steps are for the case wherein the combustion heater 17 is actuated and for a determination of a degree of the output of the combustion heater 17.

In S104, it is determined whether or not the temperature THW of the engine cooling water is lower than a predetermined temperature THW2 by using an inequality symbol "THW<THW2 ?". The predetermined temperature THW2 is a temperature set at a lower level than the aforementioned predetermined temperature THW1.

When determined affirmative in S104, the process advances to S105, and when determined negative, the process advances to S106.

The affirmative determination made in S104 means that the temperature THW of the engine cooling water is lower further than the predetermined temperature THW2 which is set lower than the predetermined temperature THW1. The negative determination made in S104 means that the temperature THW of the engine cooling water is lower than the predetermined temperature THW1 but higher than the predetermined temperature THW2.

Therefore, the affirmative determination is a determination for setting the output of the combustion heater 17 at a higher value, and the negative determination is a determination for setting the output of the combustion heater 17 at a lower value.

In S105 to which the process advanced from S104 where determined affirmative, the combustion heater execution flag F is set at "2", and, in the next S107, the output value W of the combustion heater 17 is set at a high output value Hi. After that, this routine is finished.

In S106 to which the process advanced from S104 where determined negative, the combustion heater execution flag F is set at "1", and, in the next S108, the output value W of the combustion heater 17 is set at a lower output value Lo. After that, this routine is finished.

By the output control execution routine of the combustion heater as described above, the output control of the combustion heater 17 is executed at three levels, that is, in the case wherein the output of the combustion heater 17 is set at 0, in the case wherein the output is set at a low value, and in the case wherein the output is set at a high value, on the basis of the temperature THW of the engine cooling water and in the order of a higher to a lower temperature THW. (Flowchart for operation of a fuel injection timing by the injector 10)

Next, by referring to the flowchart of FIG. 3, the fuel injection timing operation routine for determining a fuel injection timing $\theta$ by the injector 10 will be described. The fuel injection timing $\theta$ is indicated by an angle of a rotation of a crankshaft, that is, a crank angle, and is expressed as an angle before a top dead center.

The routine shown by this flowchart includes steps 201 to 206.

In S201, it is determined whether or not the combustion heater execution flag F described in relation to FIG. 2 is "0 (zero)". In other words, it is determined, by using an equation symbol "F=0 ?", as to whether or not the determination of setting the output of the combustion heater 17 at 0 (zero) was made in the output control execution routine of the combustion heater shown in FIG. 2. When determined negative in S201, the process advances to S202, and when determined affirmative, the process advances to S204.

In S204, a correction value of the timing of the fuel injection is shown when the output of the combustion heater 17 is set at 0. The correction value is represented by a reference symbol $\theta_A$. The correction value $\theta_A$ is a value indicating an amount of angle advancement to be added to a reference fuel injection timing $\theta_0$ which is a reference timing of the fuel injection, in order to obtain an optimum fuel injection timing in accordance with the operational state of the combustion heater 17. The reference fuel injection timing $\theta_0$ is obtained from arithmetic means such as an unillustrated proper map and the like and calculated by using an engine load or an engine rotational speed.

Consequently, the correction value $\theta_A$ can be expressed in terms of an injection timing angle advancement correction amount $\theta_A$.

Thus, a final fuel injection timing $\theta$ in the light of the injection timing angle advancement correction value $\theta_A$ is obtained by using the following equation (1). This process is carried out in S206 subsequent to S204.

$$\theta \leftarrow \theta_0 + \theta_A \qquad (1)$$

A concept of the injection timing angle advancement correction amount $\theta_A$ in S204 is the same concept as the injection timing angle advancement correction amount $\theta_A$ which will be described hereinafter in relation to S203 and S205, but a correction value of the injection timing angle advancement correction value $\theta_A$ is different in three steps, 204, 203 and 205. Details will be described in descriptions of the respective steps S203 and S205.

As described above, the output of the combustion heater 17 is 0, when determined affirmative in S201, and, therefore, in S204, effecting the correction of the injection timing angle advancement correction value $\theta_A$ is not necessary. Thus, the correction value is "0 (zero)", and the injection timing angle advancement correction value $\theta_A$ is 0. The meaning of this content is expressed by using a symbol "$\theta_A \leftarrow 0$". The process advances to S206 after S204.

In S202 to which the process advanced from S201 where determined negative, it is determined whether or not the combustion heater execution flag F is "1". In other words, it is determined, by using an equation sign "F=1 ?", as to whether or not the output of the combustion heater 17 was determined to be set at Lo in the output control execution routine of the combustion heater 17 of FIG. 2. When determination in S202 is affirmative, that is, when the determination is that the output of the combustion heater 17 is Lo, the process advances to S203. When determined negative in S202, that is, when the determination is that the output of the combustion heater 17 is Hi, the process advances to S205.

In S203, the correction value of the injection timing angle advancement correction value $\theta_A$ is "B" when the output of the combustion heater 17 is set at Lo. This content is expressed by using a symbol "$\theta_A \leftarrow B$". The process advances to S206 after S203.

In S205, the correction value of the injection timing angle advancement correction value $\theta_A$ is "A" when the output of the combustion heater 17 is set at Hi. This content is expressed by using a symbol "$\theta_A \leftarrow A$". The process advances to S206 after S205.

The correction value B described at S203 and the correction value A described at S205 are positive values. The correction values B and A are in a relationship of B<A. In addition to this relationship of B<A, when it is taken into consideration that the injection timing angle advancement correction value $\theta_A$ is 0 at the time when the combustion heater 17 is stopped and, therefore, the output of the heater 17 is 0 as described above, it can be said that the correction value $\theta_A$ is proportional to the output of the combustion heater 17, in other words, the correction value is increased or decreased according to the output of the combustion heater 17.

In S206, the fuel injection timings $\theta$ is obtained at three levels, namely, when the output of the combustion heater 17 is set at 0, at low output Lo, and at high output Hi, and then, the routine is finished.

It is clear from the flowchart of FIG. 3 showing the fuel injection timing operation routine that the fuel injection timing θ is different depending on the case, that is, when the output of the combustion heater 17 is set at 0, the low output Lo, or, the high output Hi. Also, it is clear that the fuel injection timing θ is the same as the reference fuel injection timing $θ_0$ when the output of the combustion heater 17 is set at 0, the fuel injection timing θ is advanced through B from the reference fuel injection timing $θ_0$ when the output of the combustion heater 17 is set at the low output Lo, and the fuel injection timing θ is advanced through A from the reference fuel injection timing $θ_0$ when the output of the combustion heater 17 is set at the high output Hi. Specifically, except when the output of the combustion heater 17 is set at 0, the fuel injection timing θ is advanced from the reference fuel injection timing $θ_0$ when the output of the combustion heater 17 is set at the low output Lo and when the output is set at the high output Hi. In other words, as the output of the combustion heater 17 is increased, the fuel injection timing θ is advanced.

(Operation and effects of the embodiment)

Next, operation and effects of the engine 1 according to the embodiment will be described.

In the engine 1, the fuel injection timing θ is controlled according to an operational state (output state) of the combustion heater 17. Therefore, if the oxidation reaction is promoted by adjusting the fuel injection timing, when the combustion gas emitted from the combustion heater containing a large amount of carbon dioxide is introduced into the mainstream 29 constituting the intake system of the engine 1, this combustion gas becomes the intake air used for engine combustion, but even in that case hydrocarbon and carbon monoxide contained in the exhaust gas emitted from the engine 1 can be decreased.

Specifically, as the output of the combustion heater 17 is increased, the fuel injection timing θ is advanced. Therefore, as the output of the combustion heater 17 is increased, the fuel injection into the cylinders is carried out earlier, and corresponding thereto, a speed of the combustion in the cylinders is increased, thereby facilitating the oxidation reaction. Thus, amounts of hydrocarbon and carbon monoxide contained in the exhaust gas of the engine 1 are decreased as compared with those when the output is smaller.

Also, the lean NOx catalyst 39 is provided in the exhaust system 7. Therefore, hydrocarbon and carbon monoxide contained in the exhaust gas are used as reducing agents of the lean NOx catalyst 39. As a result, amounts of hydrocarbon and carbon monoxide contained in the exhaust gas can be further decreased, and in addition, an amount of nitrogen oxides contained in the exhaust gas can be decreased.

Figure 4:
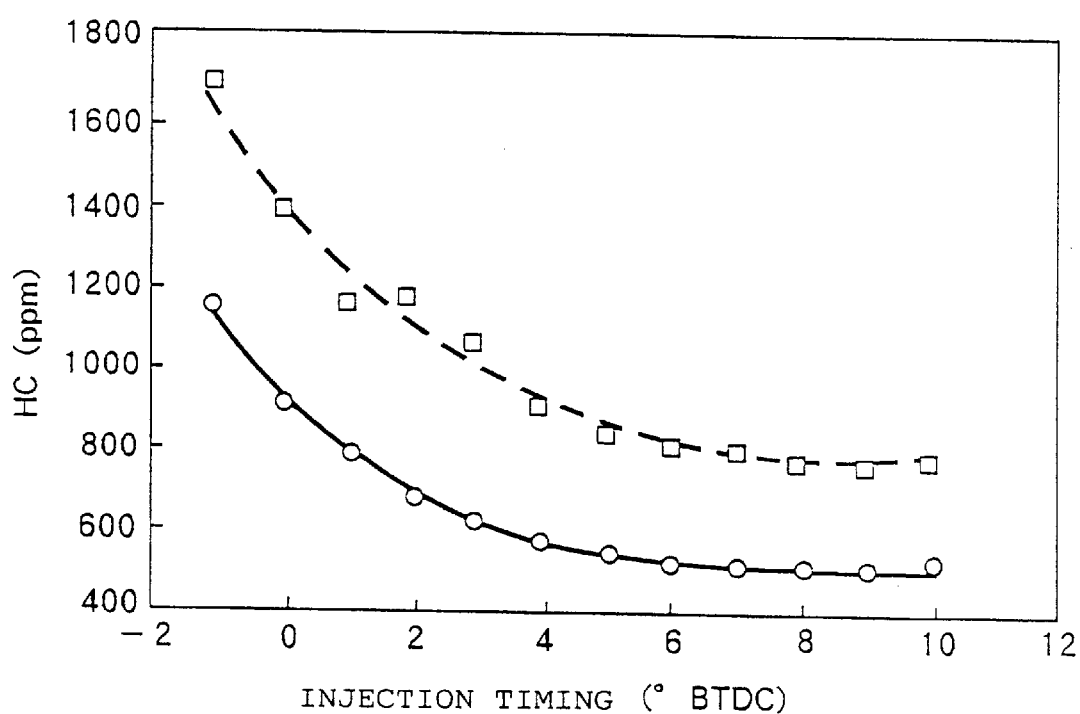
FIG. 4 is a drawing explaining that an amount of generated hydrocarbon can be suppressed.
Figure 5:
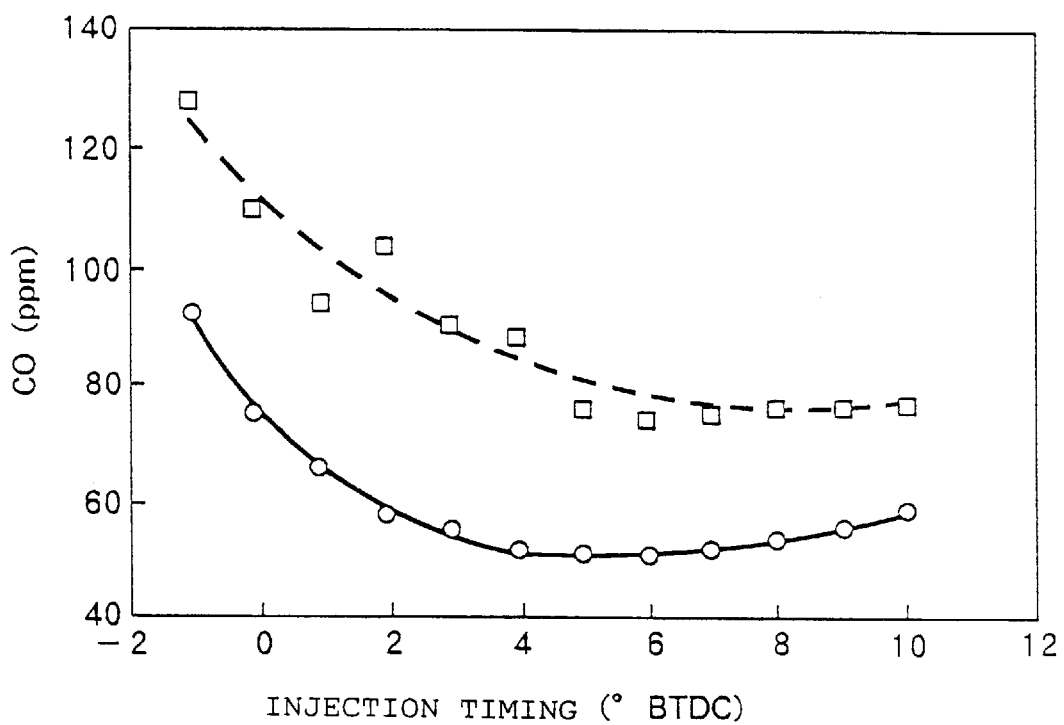
FIG. 5 is a drawing explaining that an amount of generated carbon monoxide can be suppressed.
Figure 6:
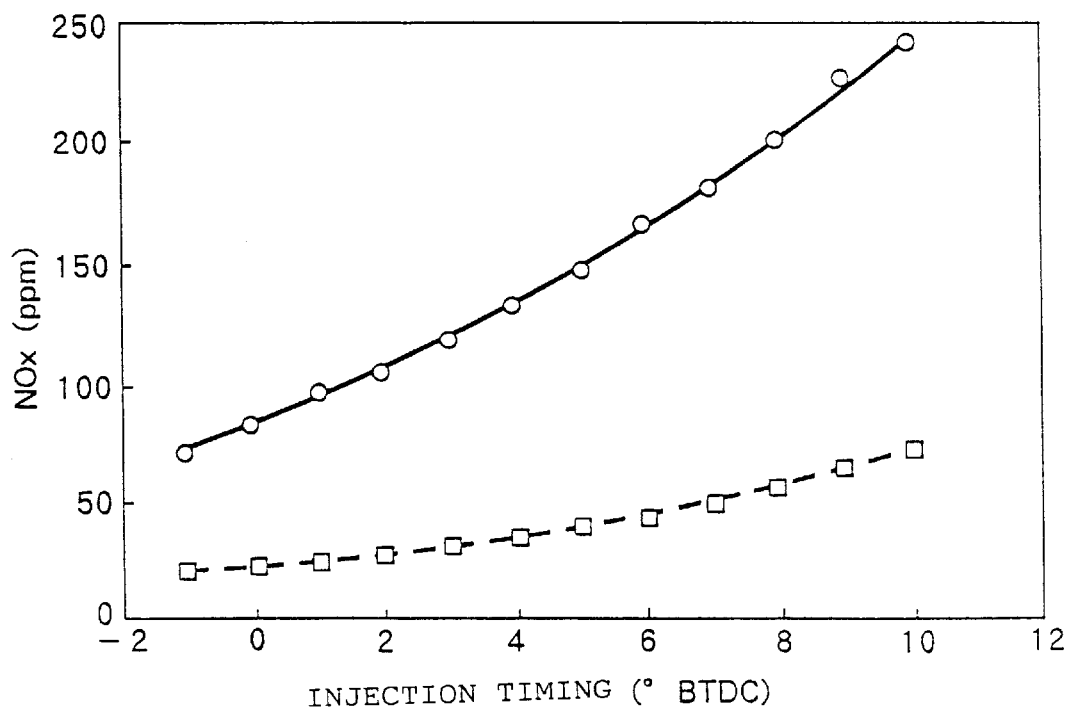
FIG. 6 is a drawing explaining that an amount of generated nitrogen oxides can be suppressed.

FIGS. 4, 5, and 6 are graphs for comparing the case wherein the output of the combustion heater 17 is set at 0 with the case wherein the output of the combustion heater 17 is set at the high output Hi in terms of a difference in amounts of generated nitrogen oxides, hydrocarbon, and carbon monoxide. A solid-line graph in each graph shows the case wherein the output of the combustion heater 17 is set at 0, while a broken-line graph shows the case wherein the output of the combustion heater 17 is set at the high output Hi.

Also, FIGS. 4, 5, and 6 respectively show proportions of hydrocarbon, carbon monoxide and nitrogen oxides in the gas discharged from the unillustrated exhaust port. In each drawing, a vertical axis shows an amount of each generated substance, while a horizontal axis shows the fuel injection timing by using the crank angle. A numerical value shown on the horizontal axis is the crank angle, and a numerical value 0 means a top dead center. Therefore, as moving right from 0 in the drawing, the injection timing is advanced, and as moving toward left, the injection timing is lagged.

The following can be said on the basis of FIGS. 4 and 5. Amounts of generated hydrocarbon and carbon monoxide in the broken-line graphs showing the case wherein the output of the combustion heater 17 is set at the high output Hi are larger than those in the solid-line graphs showing the case wherein the output of the combustion heater 17 is set at 0 in FIGS. 4 and 5. However, as the crank angle is advanced, hydrocarbon and carbon monoxide contents can be suppressed proportionally. In other words, the greater the advancement of angle, the more hydrocarbon and carbon monoxide contents are suppressed.

Also, from FIG. 6, it is clear that a nitrogen oxides content in the broken-line graph showing the case wherein the output of the combustion heater 17 is set at the high output Hi is smaller than that in the solid-line graph showing the case wherein the output of the combustion heater 17 is set at 0, and that nitrogen oxides are purified extremely effectively.

Further, in the engine 1, by introducing the combustion gas a2 emitted from the combustion heater 17 into the intake pipe 23, the combustion gas a2 becomes confluent with the fresh air a1' which has been flowing through the intake system and turns into the combustion gas mixed air a3 having the combustion heat of the combustion gas a2. Therefore, it is possible to facilitate warm-up of the engine and to enhance the performance of the car room heater by utilizing the combustion heat of the combustion heater 17.

The combustion heater 17 emits the combustion gas essentially having little smoke, that is, containing no carbon, and the combustion gas contains a high concentration of carbon dioxide. Therefore, when the combustion gas is sucked into the cylinders of the engine 1, there is no problem of causing wear and tear or corrosion of the engine, and durability of the engine may be increased, as compared with an EGR system which is a conventionally known NOx decreasing system. Furthermore, nitrogen oxides can be decreased even when a water temperature is low.

In addition, carbon dioxide itself has the effect of suppressing smoke. The reason for this is as follows: because oxygen generated by heat dissociation of carbon dioxide (that is, $CO_2 \rightarrow 2CO + O_2$ at an atmosphere temperature of 1400° C.) burns soot again and oxidizes carbon generated by carbon dioxide (that is, $CO_2 + C \rightarrow 2CO$), smoke can be suppressed even when the engine load of the internal combustion engine is high.

In the diesel engine, because of a small amount of fuel consumption, heat loss into the cooling water is essentially small. Therefore, the property of warming up the engine tends to be worsened in the diesel engine, even at the ordinary temperature. However, by actuating the combustion heater 17 when such actuation is required, the warm-up property can be largely improved. As a result, emission at the time of warm-up can be largely improved. Moreover, the exhaust heat of the combustion heater 17 can be recovered in the engine body 3. Therefore, an amount of heat received by the cooling water at the side of the internal combustion engine is increased, thereby improving a heater performance.

Furthermore, the air supply passageway 33 and the combustion gas discharge passageway 35 of the combustion heater 17 are not directly open into the atmosphere. Therefore, noise may be decreased.

What is claimed:

1. A compression-ignition internal combustion engine having a combustion heater for introducing a combustion gas into an intake system of the internal combustion engine, characterized in that a fuel injection timing by a fuel injection system of the internal combustion engine is controlled according to an operational state of the combustion heater.

2. A compression-ignition internal combustion engine having a combustion heater according to claim 1, wherein the fuel injection timing is advanced as an output of the combustion heater is increased.

3. A compression-ignition internal combustion engine having a combustion heater according to claim 2, wherein a value of an output of the combustion heater is determined by comparing an engine cooling water temperature with a predetermined temperature.

4. A compression-ignition internal combustion engine having a combustion heater according to claim 3, wherein the fuel injection timing is determined based on a magnitude of the output of the combustion heater.

5. A compression-ignition internal combustion engine having a combustion heater according to claim 4, wherein the fuel injection timing is determined based on a reference fuel injection timing which is a reference timing of fuel injection and a correction value indicating an amount of angle advancement to be added to the reference fuel injection timing.

6. A compression-ignition internal combustion engine having a combustion heater according to claim 5, wherein the correction value is increased or decreased according to the magnitude of the output of the combustion heater.

7. A compression-ignition internal combustion engine having a combustion heater according to claim 6, wherein a lean NOx catalyst is provided in an exhaust system of the internal combustion engine.

* * * * *